Figure 1:
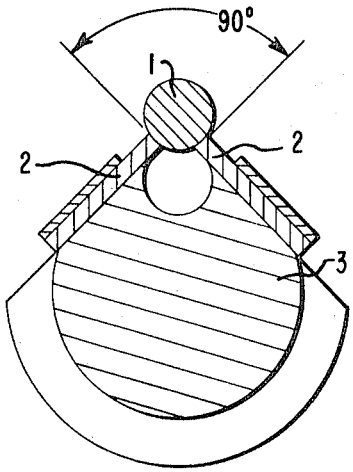
Figure 2:
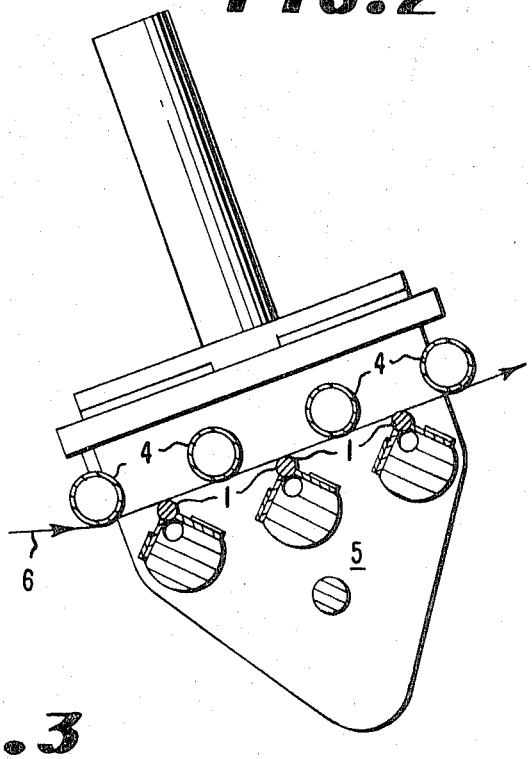
Figure 3:
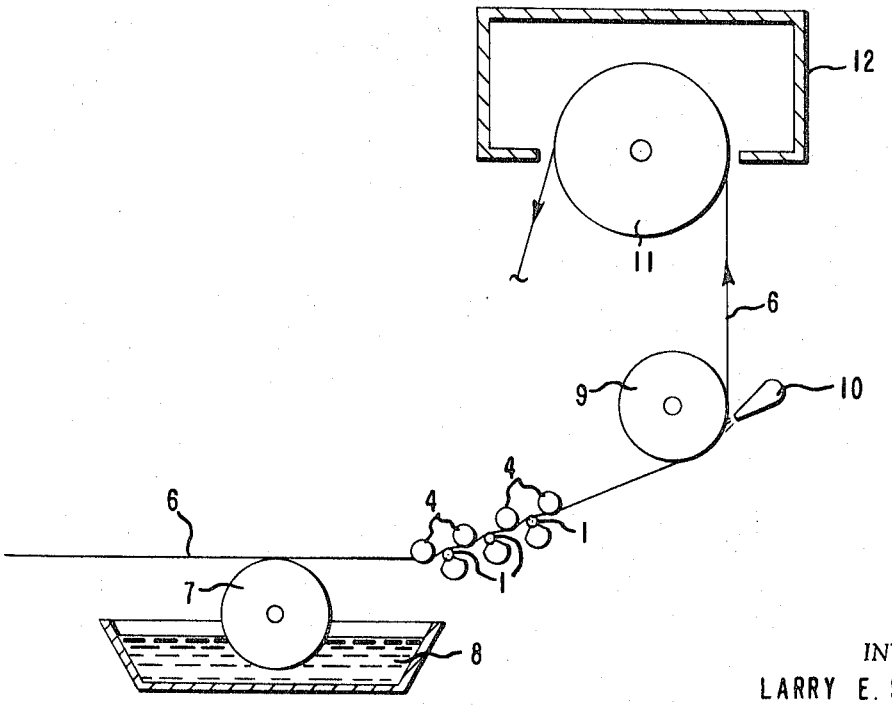

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1209

T892,002
COATING THICKNESS REGULATOR
Larry Eugene Seever, Richmond, Va., assignor to E. I. du Pont de Nemours and Company, Wilmington, Del.
Filed May 20, 1970, Ser. No. 38,928
Int. Cl. B05c *11/02, 11/06*
U.S. Cl. 118—63
1 Sheet Drawing. 8 Pages Specification

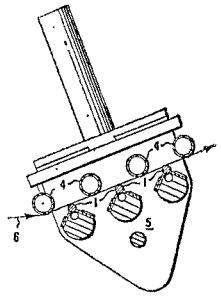

An apparatus for smoothing and regulating the thickness of liquid coatings on a thin substrate comprising at least one wire wound rod, scraping means supporting the rods and tensioning rolls for the substrate.

Nov. 23, 1971 L. E. SEEVER T892,002

COATING THICKNESS REGULATOR

Filed May 20, 1970

INVENTOR
LARRY E. SEEVER

BY Donald G. Hartley
ATTORNEY